A. LAING.
LIQUID FUEL FURNACE.
APPLICATION FILED FEB. 16, 1910.
1,025,279.
Patented May 7, 1912.
3 SHEETS—SHEET 1.
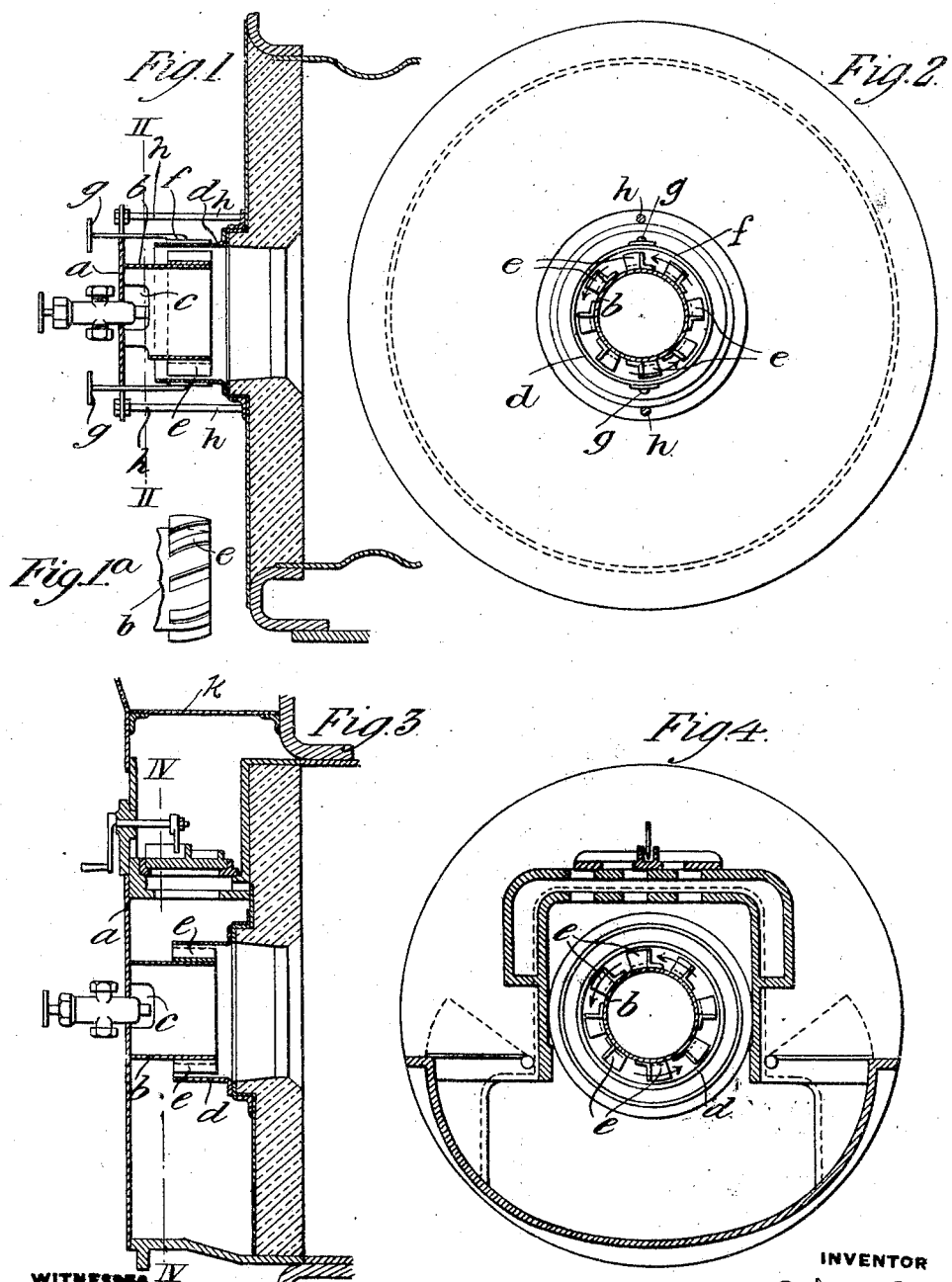

A. LAING.
LIQUID FUEL FURNACE.
APPLICATION FILED FEB. 16, 1910.
1,025,279.
Patented May 7, 1912.
3 SHEETS—SHEET 2.
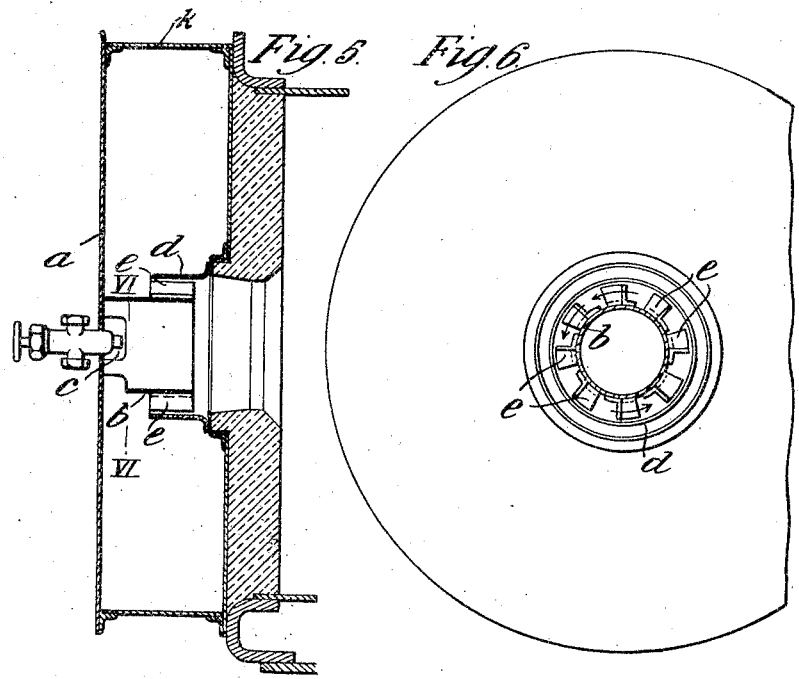
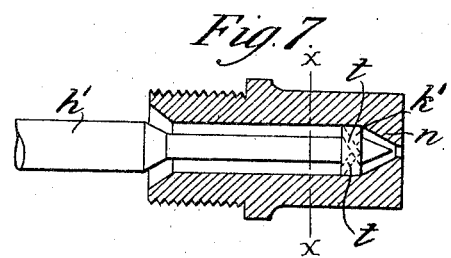
WITNESSES
Jesse B. Heller
R A Balderson
INVENTOR
Andrew Laing,
by Bakewell, Byrnes & Parmelee,
his Attys.

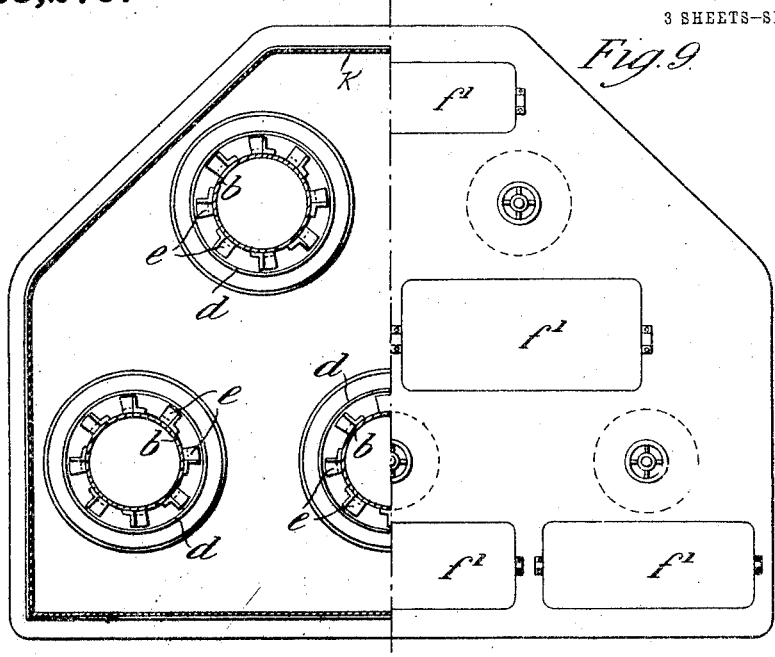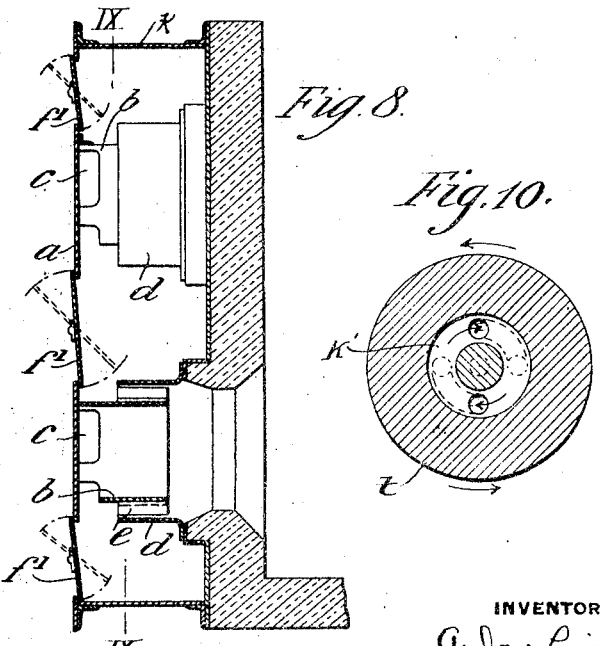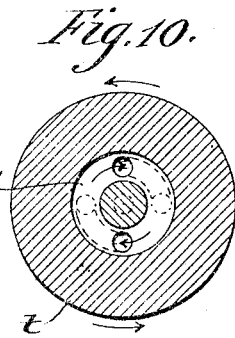

UNITED STATES PATENT OFFICE.

ANDREW LAING, OF NEWCASTLE-UPON-TYNE, ENGLAND.

LIQUID-FUEL FURNACE.

1,025,279.  Specification of Letters Patent.  Patented May 7, 1912.

Application filed February 16, 1910. Serial No. 544,178.

*To all whom it may concern:*

Be it known that I, ANDREW LAING, a subject of the King of Great Britain, residing at 15 Osborn road, Newcastle-upon-Tyne, in the county of Northumberland, England, engineer, have invented certain new and useful Improvements in Liquid-Fuel Furnaces, of which the following is a specification.

This invention relates to liquid fuel furnaces and has for its objects to reduce losses due to radiation of heat from the furnace front, to facilitate the regulation of the air supply and to obtain efficient admixture of the air and fuel spray so as to obtain complete combustion of the latter without the use of elaborate brickwork baffles and mixing chambers.

In the improved construction of the furnace front arrangement which constitutes the principal feature of the invention, each of the fuel spraying nozzles, the number of which vary according to requirements, projects through a baffle plate or the front plate of the casing into a concentric air trunk supported from the baffle plate or front plate and having lateral openings at or near its outer end. This air trunk projects concentrically within a second air trunk carried by and extending outwardly from the furnace front or front wall of the furnace but not as far as the baffle plate or front plate of the casing, and the annular space between the overlapping parts of the inner and outer air trunks is fitted with deflectors for directing the air in such manner as to mix the air required for combustion more effectually with the fuel spray. One result of this arrangement is that the openings for the supply of air are so disposed that direct radiation of heat from the furnace is prevented. The admission of the major portion of the air required for the combustion of the fuel through the second or outer air trunk keeps the outer casing cool and hence radiation from this part is reduced to a minimum. Further, the enveloping secondary supply of air insures the complete oxidation of the sprayed fuel in the front end of the furnace and thus prevents the formation of carbon deposits and leakage at the joints and combustion chamber stays. The baffle plate or the front of the casing to which the inner air trunk is attached may be so mounted that it can be adjusted in a fore and aft direction thereby simultaneously altering the relation of the air trunks and so regulating the supply of air as to admit only the quantity necessary for complete combustion, or the air supply may be regulated by means of an adjustable apparatus surrounding the outer air trunk. The fuel spraying nozzle is preferably constructed with a solid collar at the end of the adjusting spindle surmounted by a cone. This collar is bored for the passage of the fuel from the space in rear of the collar to the annulus between the cone and the conical aperture into which it projects, the holes being inclined so as to give the required gyratory motion to the fuel. The fuel is delivered to the spraying nozzle under pressure which can be varied so as to increase or decrease the rate of fuel consumption.

In the accompanying drawings Figure 1 is a section through a furnace front embodying the present invention as adapted for burning oil fuel in the furnace under natural draft. Fig. 1ª is a plan view of the deflector portion shown in Fig. 1, and Fig. 2 is a front section on the line II—II of Fig. 1, looking at the furnace front. Fig. 3 is a view similar to Fig. 1, showing the apparatus as adapted to burn liquid fuel under forced or induced draft with closed ash pit. Fig. 4 is a section on the line IV—IV in Fig. 3. Fig. 5 is a section through a furnace front showing the invention adapted to burn liquid fuel under forced or induced draft with closed ash-pit but with a construction of furnace front which is not designed to facilitate conversion of the furnace for coal fuel. Fig. 6 is a section on line VI—VI in Fig. 5, parts being removed. Fig. 7 is a detail sectional view of the fuel spraying nozzle. Fig. 8 is a section of a furnace front showing the apparatus adapted to burn liquid fuel under closed stokehold conditions, and Fig. 9 is a part section on line IX—IX in Fig. 8 and a part elevation of the apparatus in Fig. 8. Fig. 10 is a sectional view on the line X—X of Fig. 7. In these figures it will be seen that the apparatus is protected from the heat radiated from the furnace by means of a wall of refractory material, beyond which there is no necessity, with this improved method of burning oil, for any further brickwork in the furnace or combustion chamber.

In Figs. 1 and 2, $a$ is the front baffle plate above referred to, which is adjustably supported on the furnace front by the rods or brackets $h$, and attached thereto is an inner cylindrical trunk b. In this trunk b are openings c through which air can be admitted direct to the oil fuel as it issues from the sprayer. d is an outer cylindrical trunk between which and the inner cylindrical trunk b deflectors e are fitted dividing the annular space up into a number of chambers through which the major portion of the air required for combustion is admitted. These deflectors are of spiral form, as shown in Figs. 2, 4, 6 and 9 and adapted to impart a gyratory movement to the air passing between them. By this construction the radiation of the heat from the furnace to the stokehold is reduced to a minimum. Surrounding the outer trunk d a further apparatus may be fitted as for example the slide f which can be operated by means of handles g or otherwise so as to shut off partially or entirely the air supply to the furnace.

So far as the essential features of the present invention are concerned, the constructions of Figs. 3, 4 and 5, 6 are substantially identical with that of Figs. 1 and 2, and need not be separately referred to, the like parts being indicated by the same reference letters as in Figs. 1 and 2, but in Figs. 3, 5 and 8, the baffle plate a is attached to a projecting plate k so that an inclosed space may be formed opposite the boiler front.

In the construction of Figs. 8 and 9 the air supply to the burners is preferably regulated by means of adjustable doors f' in the outer front.

Figs. 7, shows the construction of the fuel spraying nozzle; h' is the adjusting spindle, k' the solid collar through which passages t t are bored at such an angle as to give the required gyratory motion to the fuel spray. The passages t, t, are preferably of spiral form and disposed so that the motion imparted by them to the fuel will be in a direction opposite to that imparted to the air passing between the spiral deflectors e. n is the nozzle constructed with the conical aperture as shown.

Having thus described my invention and the best means I know of carrying the same into practical effect, I claim:—

1. In a liquid fuel furnace, the combination with the front end of the furnace of a casing plate supported from the furnace front, a cylindrical primary air supply trunk attached to and projecting rearwardly from the said casing plate and having lateral openings at the outer end adjacent to the casing plate, a cylindrical secondary air supply trunk attached to and projecting outwardly from the front of the furnace, the said secondary air trunk being of considerably greater diameter than the primary and encircling the inner portion of the same, the annular space between the two air trunks providing a passage to the combustion chamber for the secondary air supply necessary for complete combustion of the fuel, and means for imparting gyratory motions of opposite sense to the liquid fuel and secondary air supply respectively, substantially as described.

2. A construction of liquid fuel furnaces comprising a casing plate supported on the furnace front and spaced therefrom, a liquid fuel injector projecting through the said casing plate and adapted to give a gyratory motion to the liquid fuel, a cylindrical primary air supply trunk fixed to and projecting rearwardly from the said casing plate and having lateral apertures in the neighborhood of the fuel nozzle, a cylindrical secondary air supply trunk fixed to the furnace trunk and encircling the rearward portion of the primary air trunk, said secondary air trunk being of considerably greater diameter than the primary, and spiral deflectors in the space between the two air trunks adapted to give a gyratory motion to the secondary air supply opposite in sense to the gyratory motion of the liquid fuel, substantially as described.

3. In a liquid fuel furnace, the combination with the front end of the furnace of a casing plate supported from the furnace front, a cylindrical primary air supply trunk attached to and projecting rearwardly from the said casing plate and having lateral openings at the outer end adjacent to the casing plate, a cylindrical secondary air supply trunk attached to and projecting outwardly from the front of the furnace, the said secondary air trunk being of considerably greater diameter than the primary and encircling the inner portion of the same, the annular space between the two air trunks providing a passage to the combustion chamber for the secondary air supply necessary for complete combustion of the fuel, and means for imparting a gyratory motion to both the liquid fuel and secondary air supply; substantially as described.

4. In a liquid fuel furnace, the combination with the front end of the furnace of an open ended cylindrical air supply trunk attached to and projecting outwardly from the furnace front, the outer open end of the trunk communicating with an air supply, a casing plate opposite to and supported from the furnace front, a second cylindrical air supply trunk concentric with and of a diameter considerably smaller than the first said air trunk, the second air trunk being attached to and projecting rearwardly from the casing plate, having its rearward end open and surrounded by the first air trunk so that an annular space is formed between the trunks for the passage to the combustion chamber of an air supply, the said second air trunk being provided with lateral openings at its end adjacent to the casing plate and communicating directly with an air supply exteriorly of the first air trunk, and means for adjusting the passage for the air through the first air trunk relatively to and independently of that through the second air trunk.

In testimony whereof I have signed my name to this specification in the presence of two subscribing witnesses.

ANDREW LAING

Witnesses:
MATTHEW MURRAY,
JAMES CRUICKSHANK HENDERSON.